US009630605B2

United States Patent
Shimada et al.

(10) Patent No.: US 9,630,605 B2
(45) Date of Patent: Apr. 25, 2017

(54) ELECTRIC BRAKE DEVICE (71) Applicant: HONDA MOTOR CO., LTD., Tokyo (JP)

(72) Inventors: Takashi Shimada, Wako (JP); Kazuharu Kidera, Wako (JP); Soichiro Ueura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/470,061

(22) Filed: Aug. 27, 2014

(65) Prior Publication Data
US 2015/0061366 A1 Mar. 5, 2015

(30) Foreign Application Priority Data

Aug. 29, 2013 (JP) ................................. 2013-177702

(51) Int. Cl.
*B60T 13/74* (2006.01)
*B60T 7/04* (2006.01)
(Continued)

(52) U.S. Cl.
CPC ............ *B60T 13/745* (2013.01); *B60T 7/042* (2013.01); *B60T 8/4081* (2013.01); *B60T 13/146* (2013.01); *B60T 13/662* (2013.01)

(58) Field of Classification Search
CPC ... B60T 7/042; B60T 8/34; B60T 8/40; B60T 8/94; B60T 8/4081; B60T 13/588;
(Continued)

(56) References Cited

U.S. PATENT DOCUMENTS 3,827,347 A * 8/1974 Gilman .................... B30B 9/30
100/190
6,351,050 B1 * 2/2002 Coles .................. H02K 1/2766
180/443
(Continued)

FOREIGN PATENT DOCUMENTS

JP 11-215881 A 8/1999
JP 2004-180399 A 6/2004
(Continued)

OTHER PUBLICATIONS

Office Action dated Jun. 23, 2015, issued in counterpart Japanese Application No. 2013-177702, with English translation (6 pages).

*Primary Examiner* — Melody Burch
(74) *Attorney, Agent, or Firm* — Westerman, Hattori, Daniels & Adrian, LLP (57) ABSTRACT

An electric brake device includes: a motor cylinder device that generates a hydraulic pressure in accordance with a brake operation of a driver with an electric motor; a rotational angle sensor that detects a rotor rotational angle θ of the electric motor; and a motor control section that controls an output torque of the electric motor corresponding to the rotor rotational angle θ and controls the electric motor by advancing a detection value of the rotational angle sensor. The current phase setup section sets a current phase to an advanced side as an electrical advance control. The current phase setup section inhibits the advancing the detection value when the electric motor performs reversed rotation, or sets the current phase to a retarded side.

16 Claims, 6 Drawing Sheets

(51) Int. Cl.
*B60T 13/66* (2006.01)
*B60T 13/14* (2006.01)
*B60T 8/40* (2006.01)
*B60T 8/32* (2006.01)

(58) Field of Classification Search
CPC ...... B60T 13/66; B60T 13/662; B60T 13/146;
B60T 13/74; B60T 13/745; B60T 17/221;
B60T 2250/06
USPC .............................. 303/3, 15, 191, 20; 701/70
See application file for complete search history.

(56) References Cited

U.S. PATENT DOCUMENTS

| | | | |
|---|---|---|---|
| 7,988,241 B2* | 8/2011 | Ishii | B60T 7/042 |
| | | | 303/11 |
| 2006/0163939 A1* | 7/2006 | Kuramochi | B60T 8/885 |
| | | | 303/122.04 |
| 2010/0090637 A1* | 4/2010 | Savitz | H02P 23/14 |
| | | | 318/494 |
| 2011/0224881 A1* | 9/2011 | Matsushita | B60T 7/042 |
| | | | 701/70 |
| 2011/0314806 A1* | 12/2011 | Ishizuka | B60T 7/042 |
| | | | 60/545 |

FOREIGN PATENT DOCUMENTS

| | | | |
|---|---|---|---|
| JP | 2008-184057 A | | 8/2008 |
| JP | 2009-177934 A | | 8/2009 |
| JP | 2011-143850 A | | 7/2011 |
| JP | 2011188591 A | * | 9/2011 |
| JP | 2013-023176 A | | 2/2013 |

\* cited by examiner

ELECTRIC BRAKE DEVICE

CROSS REFERENCES TO RELATED APPLICATIONS

The present application claims priority under 35 U.S.C. §119 to Japanese Patent Application No. 2013-177702, filed Aug. 29, 2013, entitled "Electric Brake Device." The contents of this application are incorporated herein by reference in their entirety.

TECHNICAL FIELD

The present disclosure relates to electric brake devices applicable to brake-by-wire systems.

BACKGROUND

In an electric brake system of a brake-by-wire type, a target brake pressure is calculated by using a driver input of, for example, a pedal travel, and various types of actuators generate a hydraulic pressure so as to obtain a target hydraulic pressure.

Such an electric brake system uses an electric motor as an actuator for generating a brake hydraulic pressure. The electric motor may use an interior permanent magnet (IPM) motor in which a permanent magnet is placed in a rotor and a coil is driven by an inverter (see, for example, Japanese Unexamined Patent Application Publication No. 2011-143850). The IPM motor can obtain a reluctance torque caused by a change in magnetic reluctance in a gap between a stator and a rotor in addition to a magnetic torque caused by a suction/repulsive force between the coil and the permanent magnet. Thus, the IPM motor is preferably used for applications requiring high-power performance, e.g., drive motors of electric vehicles such as hybrid vehicles. The IPM motor can also be used for motors for driving electric hydraulic pressure generators that generate hydraulic pressures in accordance with brake operations of drivers.

The torque of an IPM motor is a combined torque which is a combination of a magnetic torque and a reluctance torque, which are functions of advance values. The IPM motor needs to set a current phase such that the combined torque of the magnetic torque and the reluctance torque is at maximum.

To generate the above-described reluctance torque, an advance control that produces a mechanical offset (an advance amount) of a sensor attachment position is employed. This advance control is performed by mechanically offsetting an attachment position of, for example, a Hall sensor for specifying the position of the IPM motor. The offset that causes an appropriate advance angle is sufficiently considered. Specifically, an angle sensor is attached with an offset corresponding to an angle at which a reluctance torque is at maximum, thereby enabling generation of a maximum torque of the IPM motor.

SUMMARY

In the advance control with a mechanical offset, however, an offset might vary because of an error in the position at which a sensor is attached. A variation in the amount of the offset might reduce the accuracy of the advance control.

In addition, the advance control with an mechanical offset can amplify a torque in one rotational direction, but in a reversed rotational direction, the control becomes a retard control, and a possible applied torque decreases. For example, in the case of using an IPM motor as an actuator for generating a brake pressure, control needs to be performed in both of a pressure reduction and a pressure increase. An excessive advance amount of the attachment position of the angle sensor for amplifying a torque (a combined torque) in one rotational direction disadvantageously degrades controllability in the other rotational direction.

The present application describes an electric brake device capable of optimally controlling a torque.

In a first aspect of the embodiment, an electric brake device includes: an electric hydraulic pressure generator configured to generate a hydraulic pressure in accordance with a brake operation of a driver with an electric motor; a rotational angle sensor configured to detect a rotational angle of the electric motor; and an electric motor controller configured to control an output torque of the electric motor corresponding to the rotational angle, wherein the electric motor controller controls the electric motor by advancing a detection value of the rotational angle sensor.

In the first aspect, an electric brake device capable of optimally controlling a torque can be provided.

In a second aspect of the embodiment, the electric motor controller inhibits the advancing the detection value when the electric motor performs reversed rotation.

In the second aspect, the advance is set at zero in reversed rotation, thereby enhancing controllability of the reversed rotation.

In a third aspect of the embodiment, in the case of using a mechanical offset of an attachment position of the rotational angle sensor, the electric motor controller advances the detection value based on an error occurring in the mechanical offset.

In the third aspect, a decrease in maximum hydraulic pressure due to, for example, an error in a mechanical offset can be reduced, and thus, accuracy of an advance control can be enhanced.

In a fourth aspect of the embodiment, the electric motor controller performs an electrical advance control that advances a current phase of an inverter that drives the electric motor.

In the fourth aspect, an electric brake device capable of optimally controlling a torque can be provided.

According to the embodiment, an electric brake device capable of optimally controlling a torque can be provided.

BRIEF DESCRIPTION OF THE DRAWINGS

The advantages of the disclosure will become apparent in the following description taken in conjunction with the following drawings.

DETAILED DESCRIPTION

Figure 1:
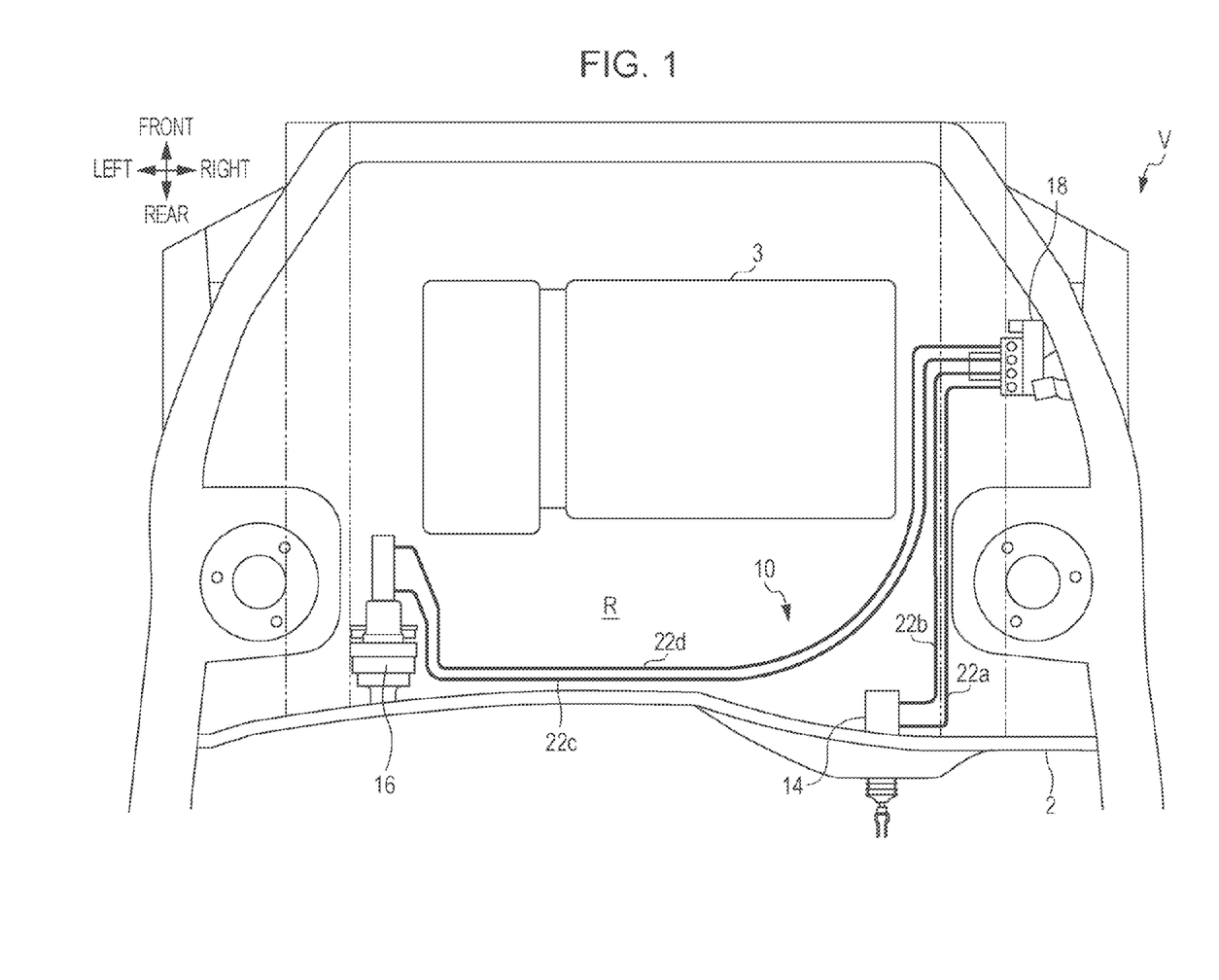
FIG. 1 illustrates an arrangement configuration of an electric brake device according to an embodiment of the present disclosure in a vehicle.

An embodiment of the present disclosure will be described in detail with reference to the drawings.
(Embodiment)
FIG. 1 illustrates an arrangement configuration of an electric brake device according to an embodiment of the present disclosure in a vehicle. In FIG. 1, longitudinal and transverse directions (i.e., left, right, front, and rear) of a vehicle V are indicated by arrows. An electric brake device 10 can be mounted on various vehicles including automobiles driven only by engines (internal combustion engines), hybrid automobiles, electric automobiles, and fuel cell automobiles.

The electric brake device 10 including a vehicle stability assist device 18 (hereinafter referred to as a VSA device 18 where VSA is a registered trademark) of this embodiment includes both a brake-by-wire system that actuates a brake by transmitting an electrical signal and a conventional hydraulic brake system that actuates a brake by hydraulic transmission as a fail-safe.

As illustrated in FIG. 1, the VSA device 18 is connected to a master cylinder device 14 and a motor cylinder device 16 (an external pressure source), and these components constitute the electric brake device 10. The electric brake device 10 is applicable to front-wheel-drive vehicles, rear-wheel-drive vehicles, and four-wheel-drive vehicles.

Here, the master cylinder device 14 is applied to a right-hand drive vehicle, and is fixed to the right side in the vehicle width direction of a dashboard 2 with bolts or the like interposed therebetween. The master cylinder device 14 may be applied to a left-hand drive vehicle.

The motor cylinder device 16 is located at the left side in the vehicle width direction, i.e., opposite to the master cylinder device 14, and attached to the vehicle body, e.g., a left-side frame, with an mounting bracket (not shown) interposed therebetween. The motor cylinder device 16 may be configured to generate a brake hydraulic pressure based on not only an electrical signal in accordance with a brake operation of the driver but also an electrical signal in accordance with other physical quantities. The electrical signal in accordance with other physical quantities is, for example, a signal used for an automatic brake system for avoiding collision or the like of the vehicle V in which an electronic control unit (ECU) determines surroundings of the vehicle V with, for example, a sensor, independently of a brake operation of the driver.

The VSA device 18 has an antilock brake system (ABS) function of preventing wheel lock during braking, a traction control system (TCS) function of preventing wheel slip during acceleration, and an electronic stability control (ESC) function of reducing skidding when turning, for example. The VSA device 18 is attached to the vehicle body at, for example, a right front end in the vehicle width direction with a bracket interposed therebetween. The VSA device 18 may have only an ABS function of preventing wheel lock during braking.

The VSA device 18 is connected to the master cylinder device 14 through piping tubes 22a and 22b and to the motor cylinder device 16 through pipes 22c and 22d in a structure room R in which a structure 3 including an engine and a drive motor are mounted and which is located forward of the dashboard 2 of the vehicle V. The VSA device 18 is disposed at a location separated from the master cylinder device 14 and the motor cylinder device 16.

Figure 2:
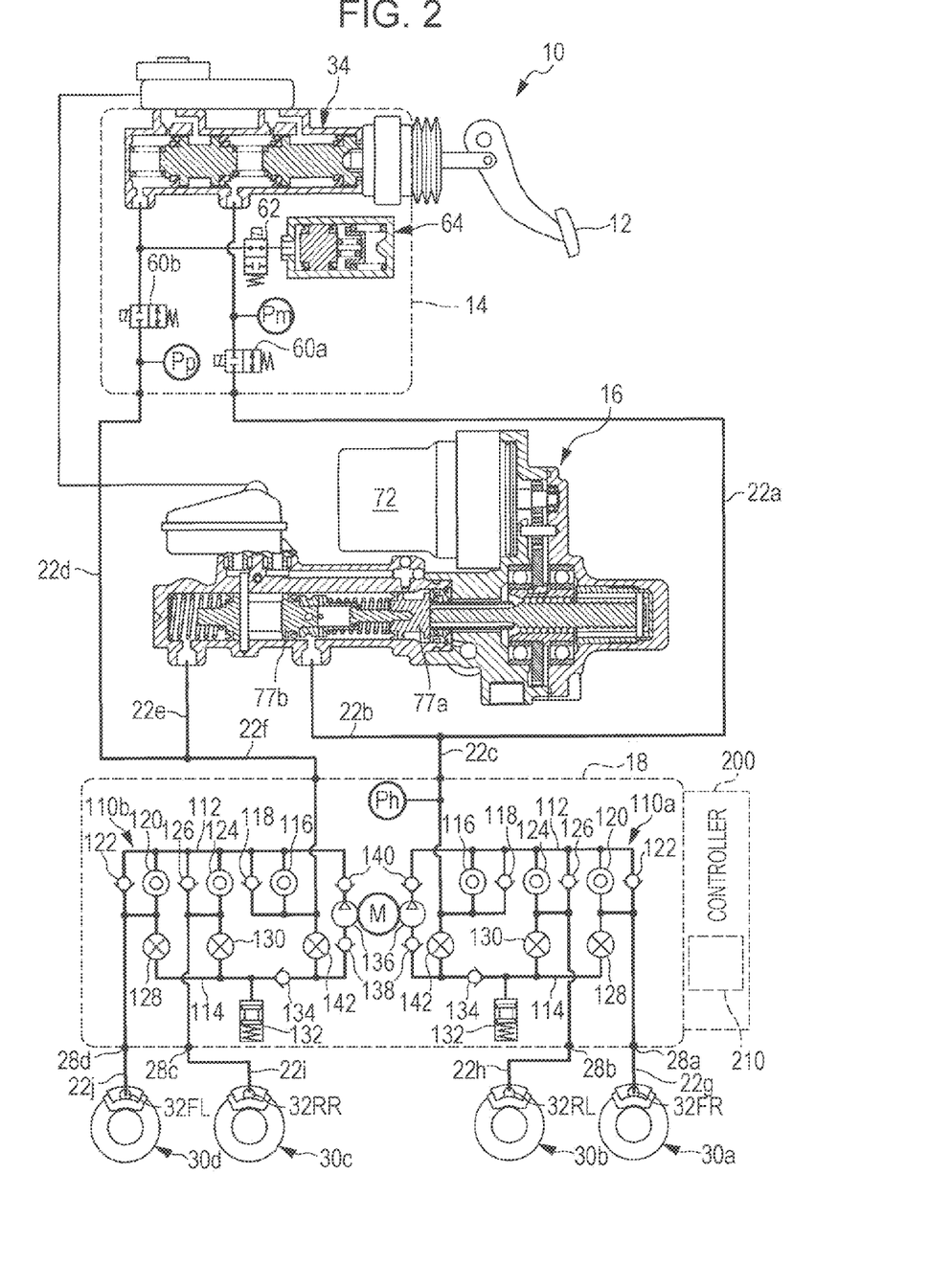
FIG. 2 schematically illustrates a configuration of the electric brake device of the embodiment.

FIG. 2 schematically illustrates a configuration of the electric brake device 10.

In the following description, four wheels, devices attached to these four wheels, members (e.g., tires and suspensions), functional components, and signals of, for example, a target current, are denoted by characters followed by "FL" indicating a front left wheel, "FR" indicating a front right wheel, "RL" indicating a rear left wheel, and "RR" indicating a rear right wheel, which are sometimes in the form of superscripts, e.g., wheel cylinders 32FR, 32RL, 32RR, and 32FL, or collectively, the wheel cylinders 32.

As illustrated in FIG. 2, the electric brake device 10 includes a master cylinder 34 that converts leg power input from the driver with a brake pedal 12 into a brake hydraulic pressure, a motor cylinder device 16 that generates a brake hydraulic pressure depending on a brake hydraulic pressure generated in the master cylinder 34 or independently of this brake hydraulic pressure, the VSA device 18, and disc brake mechanisms 30a-30d, for example. The motor cylinder device 16 includes first and second slave pistons 77a and 77b each of which receives a driving force of an electric motor 72 and generates a brake hydraulic pressure. The motor cylinder device 16 constitutes an electric hydraulic pressure generator that generates a hydraulic pressure in accordance with an brake operation of the driver by means of the electric motor 72.

[Electric Motor 72]

The electric motor 72 is an IPM motor in which a permanent magnet is buried in, for example, a rotor and a coil is driven by an inverter. The electric motor 72 is a brushless DC motor including a hollow stator with coils having three phases (hereinafter referred to as a U phase, a V phase, and a W phase) and a rotor that is placed in the hollow portion of the stator, has permanent magnets with multiple poles, and rotates. A surface permanent magnet (SPM) motor with permanent magnets disposed on the surface of a rotor may be used. The IPM motor can generate a reluctance torque as well as a magnetic torque, and is superior to an SPM motor in terms of output characteristics (a high torque characteristic (high acceleration)) and efficiency (a torque conversion efficiency). The torque of an IPM motor is a combined torque which is a combination of a magnetic torque and a reluctance torque, and a current phase needs to be adjusted to obtain a maximum combined torque. For example, the position (a rotor rotational angle θ) and rotational speed of the rotor of the electric motor 72 are detected, and depending on the level of a rotational speed detection signal, the phase of the position detection signal is advanced, i.e., so-called advance control is performed.

The piping tubes 22a-22f are provided with brake hydraulic pressure sensors Pm, Pp, and Ph that detect brake hydraulic pressures. The VSA device 18 includes a pump 136 for pressurizing brake fluid.

The VSA device 18 is located between the master cylinder 34 connected to the brake pedal 12 and the wheel cylinders 32FR, 32RL, 32RR, and 32FL of the wheels. The VSA device 18 is a hydro/unit (H/U) including, for example, a solenoid valve capable of individually controlling hydraulic pressures of the pumps for pressurizing brake fluid and the wheel cylinders 32FR, 32RL, 32RR, and 32FL of the wheels. The VSA device 18 is controlled by a controller 200, which will be described later.

The VSA device 18 has a brake holding function of generating a braking force after pressing of the brake pedal 12 is released, in a manner similar to that when pressing the pedal. When the master cylinder pressure decreases below a predetermined holding hydraulic pressure while the vehicle is stopped (engine idling is stopped), the brake holding function holds the hydraulic pressures of the wheel cylinders 32FR, 32RL, 32RR, and 32FL at the holding hydraulic pressure or higher and prevents the vehicle from moving at restart. In other cases where the vehicle is stopped on a slope, for example, a braking force similar to a force applied when the driver presses the brake pedal 12 in order to prevent the vehicle from moving is applied in some cases.

The VSA device 18 includes a second brake system 110a that controls the disc brake mechanisms 30a and 30b (the wheel cylinder 32FR and the wheel cylinder 32RL) of the front right wheel and the rear left wheel and a first brake system 110b that controls the disc brake mechanisms 30c and 30d (the wheel cylinder 32RR and the wheel cylinder 32FL) of the rear right wheel and the front left wheel.

The second brake system 110a and the first brake system 110b have the same structure, and thus, the same reference numerals denote corresponding components of the second brake system 110a and the first brake system 110b. In the following description, the second brake system 110a will be mainly described and description of the first brake system 110b is added in parentheses when necessary.

The second brake system 110a (the first brake system 110b) includes a first common hydraulic pressure path (a supply liquid path) 112 and a second common hydraulic pressure path (a supply liquid path) 114 that are common to the wheel cylinders 32FR and 32RL (32RR and 32FL).

The second brake system 110a includes a regulator valve 116 of a normally open solenoid valve disposed between an inlet port 26a and the first common hydraulic pressure path 112, a first check valve 118 disposed in parallel with the regulator valve 116 and allowing brake fluid (hydraulic fluid) to flow from the inlet port 26a to the first common hydraulic pressure path 112 (i.e., preventing the brake fluid from flowing from the first common hydraulic pressure path 112 to the inlet port 26a), and a first in-valve (a normally open pressure-increasing valve) 120 of a normally open solenoid valve disposed between the first common hydraulic pressure path 112 and a first outlet port 28a.

The second brake system 110a includes a second check valve 122 disposed in parallel with the first in-valve 120 and allowing brake fluid to flow from the first outlet port 28a to the first common hydraulic pressure path 112 (i.e., preventing the brake fluid from flowing from the first common hydraulic pressure path 112 to the first outlet port 28a), a second in-valve (a normally open pressure-increasing valve) 124 of a normally open solenoid valve disposed between the first common hydraulic pressure path 112 and a second outlet port 28b, and a third check valve 126 disposed in parallel with the second in-valve 124 and allowing brake fluid to flow from the second outlet port 28b to the first common hydraulic pressure path 112 (i.e., preventing the brake fluid from flowing from the first common hydraulic pressure path 112 to the second outlet port 28b).

The second brake system 110a includes a first out-valve (a normally closed pressure-reducing valve) 128 of a normally closed solenoid valve disposed between the first outlet port 28a and the second common hydraulic pressure path 114, a second out-valve (a normally closed pressure-reducing valve) 130 of a normally closed solenoid valve disposed between the second outlet port 28b and the second common hydraulic pressure path 114, a reservoir (a low-pressure source) 132 connected to the second common hydraulic pressure path 114, and a fourth check valve 134 disposed between the first common hydraulic pressure path 112 and the second common hydraulic pressure path 114 and allowing brake fluid to flow from the second common hydraulic pressure path 114 to the first common hydraulic pressure path 112 (i.e., preventing the brake fluid from flowing from the first common hydraulic pressure path 112 to the second common hydraulic pressure path 114).

The second brake system 110a further includes a pump 136 disposed between the fourth check valve 134 and the first common hydraulic pressure path 112 and supplying brake fluid from the second common hydraulic pressure path 114 to the first common hydraulic pressure path 112, an inlet valve 138 and a discharge valve 140 sandwiching the pump 136, a motor M that drives the pump 136, and a suction valve 142 of a normally closed solenoid valve disposed between the second common hydraulic pressure path 114 and the inlet port 26a.

[Controller 200]

In the controller 200, a central processing unit (CPU), a read only memory (ROM) storing a control program, a random access memory (RAM), input and output ports, etc. are mounted on an electronic circuit board, and the CPU reads the control program from the ROM, extracts the program into the RAM, and executes various types of processing to implement several functions such as described in the present embodiment.

The controller 200 controls operations of a first cutoff valve 60b, a second cutoff valve 60a, a third cutoff valve 62, a regulator valve 116, the first in-valve 120, the second in-valve 124, the first out-valve 128, the second out-valve 130, and the motor M, based on detection values (i.e., an upstream hydraulic pressure and a downstream hydraulic pressure) of pressure sensors Pm and Pp, a detection value of, for example, a stroke sensor S (see FIG. 2) that detects the operation amount of the brake pedal 12.

The controller 200 also includes a motor control section 210 that controls the electric motor 72 of the motor cylinder device 16.

The motor control section 210 controls the output torque of the electric motor 72 corresponding to the rotor rotational angle θ of the electric motor 72. The motor control section 210 advances the detection value of a rotational angle sensor 201, thereby controlling the electric motor 72. The motor control section 210 inhibits the advance when the electric motor 72 rotates in the reverse direction. When the attachment position of the rotational angle sensor 201 is offset, the motor control section 210 performs an advance in consideration of an error occurring with this offset.

Figure 3:
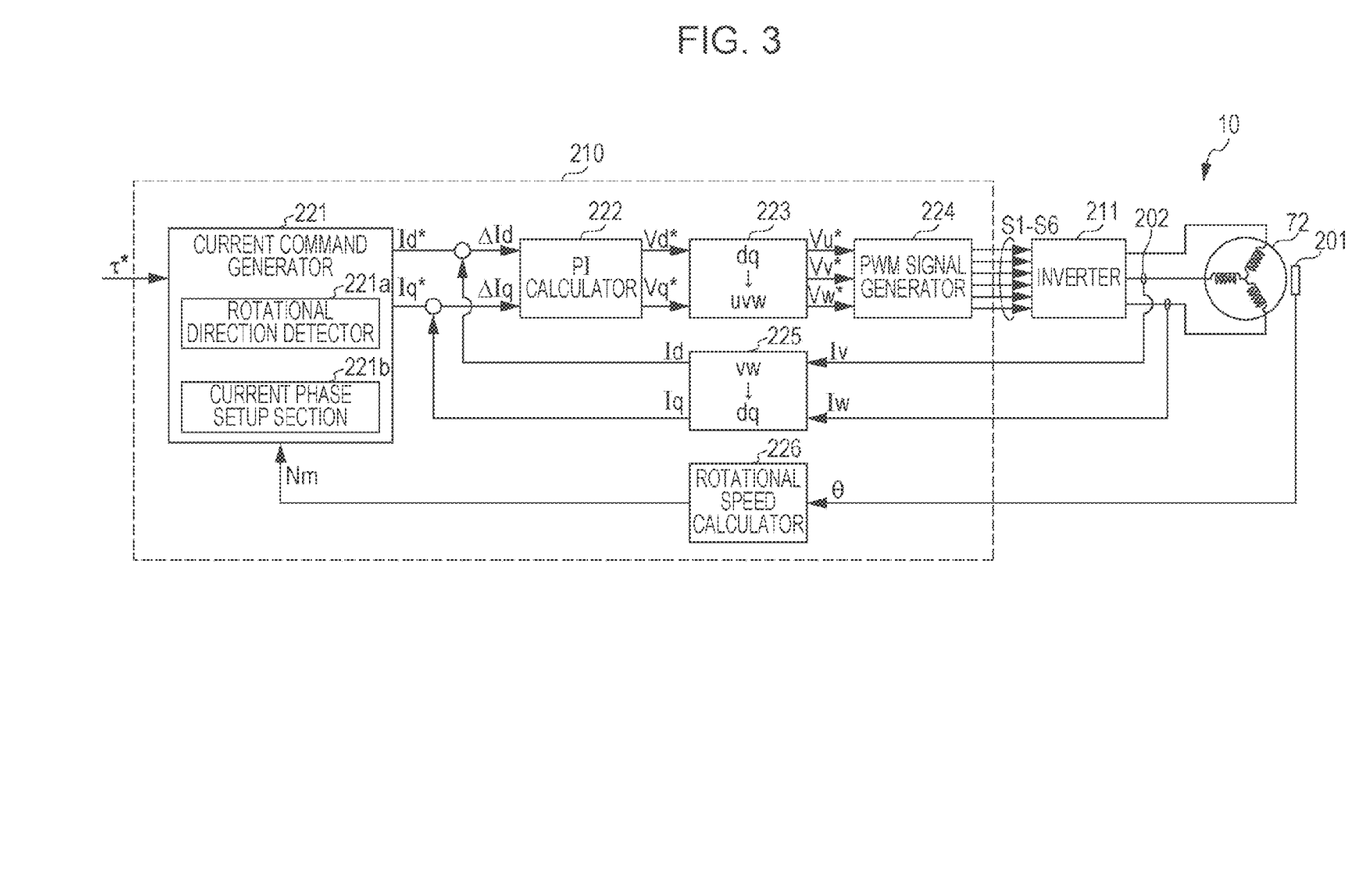
FIG. 3 is a block diagram illustrating a configuration of a motor control section of the electric brake device of the embodiment.

FIG. 3 is a block diagram illustrating a configuration of the motor control section 210.

As illustrated in FIG. 3, the electric brake device 10 includes the electric motor 72, an inverter 211 that converts a DC voltage into a three-phase AC voltage and supplies the AC voltage to the electric motor 72, and a motor control section 210 that controls driving of the electric motor 72.

The electric brake device 10 includes a rotational angle sensor 201 that detects a rotor rotational angle θ of the electric motor 72 and a current sensor 202 that detects current flowing in the electric motor 72, as sensors for detecting information necessary for control of the electric motor 72 by the motor control section 210.

The electric motor 72 includes a stator including U-phase, V-phase, and W-phase coils and a rotor including permanent magnets, and is driven by a three-phase output of the inverter 211. In this embodiment, the electric motor 72 is an IPM motor, and when a revolving magnetic field of the stator acts on the rotor, a magnetic torque and a reluctance torque are generated.

[Sensor]

The rotational angle sensor 201 detects a rotor rotational angle θ of the electric motor 72. The rotational angle sensor 201 detects a difference in rotational speed between a rotating rotor and an object that does not rotate.

The current sensor 202 detects a current flowing in the electric motor 72. Since the sum of instantaneous values of currents Iu, Iv, and Iw of the three phases is zero, it is sufficient to dispose the current sensor 202 such that the current sensor 202 detects motor currents (e.g., a V-phase current Iv and a W-phase current Iw) corresponding to two phases.

[Inverter 211]

The inverter 211 includes U-phase upper and lower arms, V-phase upper and lower arms, and W-phase upper and lower arms corresponding to the three phases of the electric motor 72, and each of the upper and lower arms includes a plurality of switching devices. Examples of the switching devices include semiconductor devices such as insulated-gate bipolar transistors (IGBTs), metal-oxide-semiconductor field-effect transistors (MOSFETs) for electric power switching, and bipolar transistors for electric power switching. Turning on/off of the switching devices is controlled based on switching control signals S1-S6 output from the motor control section 210.

When a torque command τ* of the electric motor 72 is positive, the inverter 211 turns the switching devices on or off based on the switching control signals S1-S6 and controls driving such that the electric motor 72 outputs a positive torque.

[Motor Control Section 210]

The motor control section 210 generates a switching control signal for controlling switching operation of the inverter 211 in accordance with the torque command τ* as an output request, and controls the electric motor 72 through the inverter 211.

The motor control section 210 includes a current command generator 221, a PI calculator 222, a first coordinate converter 223, a pulse width modulation (PWM) signal generator 224, a second coordinate converter 225, and a rotational speed calculator 226.

In a PWM control, a sine wave-like voltage command in accordance with the torque command τ* and a carrier, which is a triangular wave, are compared with each other, and a pulse signal that is one (ON) when the sine wave is larger than the triangular wave and is zero (OFF) when the sine wave is smaller than the triangular wave is generated. The voltage commands correspond to individual phases of the electric motor 72, and are supplied as sine wave signals having phase differences of 120°. The switching devices are turned on or off on the basis of a generated pulse signal, thereby applying a pulse width modulation voltage as a pseudo sine wave voltage to each phase. The motor control section 210 can apply synchronous PWM control that synchronizes the frequency of the carrier and the rotational frequency of the electric motor 72.

The motor control section 210 functions as an electric motor controller that controls an output torque of the electric motor 72 corresponding to a rotor rotational angle θ. The motor control section 210 advances the detection value of the rotational angle sensor 201, and thereby, controls the electric motor 72. That is, the motor control section 210 performs an advance control in which the phase of the rotor rotational angle θ, which is a position detection signal, is advanced. In this manner, a voltage whose phase is advanced relative to an induced voltage can be applied to the inverter 211. The above-described electrical advance control will be specifically described later, and is performed by setting a current phase of a current phase setup section 221b (which will be described later) of the current command generator 221 of the motor control section 210.

The current command generator 221 obtains a current command I* from a torque command τ* to the electric motor 72 and a rotational speed Nm of the electric motor 72, in accordance with a previously stored map, for example. The current command generator 221 also generates a d-axis current command Id* and a q-axis current command Iq* from the current command I*. The rotational speed Nm of the electric motor 72 is calculated by the rotational speed calculator 226 based on the detected rotor rotational angle θ. The previously determined map is, for example, a τ–N control map that defines the relationship between the torque and the rotational speed for each current value.

The current command generator 221 includes a rotational direction detector 221a that detects a stoppage or the rotational direction of the electric motor 72 and the current phase setup section 221b that sets a current phase such that a combined torque which is a combination of a magnetic torque and a reluctance torque is at maximum.

The rotational direction detector 221a detects a rotational direction (i.e., a normally boosting side) of the electric motor 72 and its reversed rotational direction (i.e., a normally decompressing side) of the electric motor 72, on the basis of the rotor rotational angle θ detected by the rotational angle sensor 201 and the rotational speed Nm calculated by the rotational speed calculator 226. The electric motor 72 is a motor requiring a relatively large torque. The rotational direction detector 221a detects that the electric motor 72 is stopped or rotates at a speed less than or equal to that of the resolution of the angular velocity sensor 201 in the rotational direction of the electric motor 72.

The current phase setup section 221b sets a current phase on the basis of the torque command τ* and the current command I* obtained from the rotational speed Nm. On the basis of the current command I*, the current phase setup section 221b generates the d-axis current command Id* and the q-axis current command Iq*.

The current phase setup section 221b sets the current phase at an advanced side as an electrical advance control. The current phase setup section 221b inhibits an advance control or sets the current phase at a retarded side when the electric motor 72 reversely rotates. In the case of employing an electrical advance control and a mechanical offset that offsets an attachment position of the rotational angle sensor 201, the current phase setup section 221b sets the current phase at an advanced side in consideration of the mechanical offset. When the current phase is set at zero, the current phase setup section 221b sets the q-axis current command Iq* at zero.

The PI calculator 222 generates a d-axis voltage command Vd* and a q-axis voltage command Vq* in accordance with a control deviation. The PI calculator 222 receives a deviation $\Delta id$ ($\Delta id = Id^* - Id$) between the d-axis current command Id* generated by the current command generator 221 and a d-axis current Id calculated by the second coordinate converter 225 and a deviation $\Delta Iq$ ($\Delta Iq = Iq^* - Iq$) between the q-axis current command Iq* generated by the current command generator 221 and a q-axis current Iq calculated by the second coordinate converter 225. The PI calculator 222 performs PI operation (proportional integral operation) with a predetermined gain on each of the d-axis current deviation $\Delta Id$ and the q-axis current deviation $\Delta Iq$ to obtain a control deviation, and generates a d-axis voltage command Vd* and a q-axis voltage command Vq* in accordance with this control deviation.

The first coordinate converter 223 performs coordinate conversion (from the second phase to the third phase) using a rotor rotational angle θ of the electric motor 72, and converts the d-axis voltage command Vd* and the q-axis voltage command Vq* obtained by the PI calculator 222 into voltage commands Vu*, Vv*, and Vw* corresponding to the phases of the electric motor 72.

The PWM signal generator 224 generates switching control signals S1-S6 for turning on/off of the six switching device of the inverter 211, for example, on the basis of a comparison between the voltage commands Vu*, Vv*, and Vw* corresponding to the phases and supplied from the first coordinate converter 223 and a carrier. The inverter 211 is switched on the basis of the switching control signals S1-S6, thereby applying an AC voltage for outputting a torque in accordance with a torque command τ*, to the electric motor 72.

The second coordinate converter 225 performs coordinate conversion (from the third phase to the second phase) using a rotor rotational angle θ, and calculates a d-axis current Id and a q-axis current Iq on the basis of the V-phase current Iv and the W-phase current Iw detected by the current sensor 202.

The rotational speed calculator 226 calculates a rotational speed Nm of the electric motor 72 on the basis of the rotor rotational angle θ detected by the rotational angle sensor 201.

Operation of the electric brake device 10 including the VSA device 18 with the above-described configuration will now be described.

First, basic operation of the electric brake device 10 will be described.

In the electric brake device 10, in normal operation of the motor cylinder device 16 or the controller 200 that controls brake-by-wire operation, when a driver presses the brake pedal 12, a so-called brake-by-wire system becomes active. Specifically, in a braking force controller 7 in normal operation, when the driver presses the brake pedal 12, the first cutoff valve 60a and second cutoff valve 60b cut off communication between the master cylinder 34 and the disc brake mechanisms 30a-30d (the wheel cylinders 32FR, 32RL, 32RR, and 32FL) braking the wheels, and at the same time, the disc brake mechanisms 30a-30d are actuated to brake the wheels by using a brake hydraulic pressure generated by the motor cylinder device 16.

Thus, the braking force generator 10 is preferably used for vehicles such as electric vehicles (including fuel cell vehicles) and hybrid automobiles, in which a small amount of negative pressure is generated by an internal combustion engine or no negative pressure is generated in the internal combustion engine and for vehicles including no internal combustion engines.

In normal operation, the first cutoff valve 60a and the second cutoff valve 60b are cut off, the third cutoff valve 62 is opened, and brake fluid flows from the master cylinder 34 into a stroke simulator 64. Thus, although the first cutoff valve 60a and the second cutoff valve 60b are cut off, brake fluid moves so that a stroke occurs in the brake pedal 12.

On the other hand, in the braking force generator 10, in an abnormal state in which the motor cylinder device 16 or the controller 200 is inactive, when the driver presses the brake pedal 12, an existing hydraulic brake system becomes active. Specifically, in the braking force generator 10 in an abnormal state, when the driver presses the brake pedal 12, the first cutoff valve 60a and the second cutoff valve 60b are opened, the third cutoff valve 62 is closed, and a brake hydraulic pressure generated by the master cylinder 34 is transmitted to the disc brake mechanisms 30a-30d (the wheel cylinders 32FR, 32RL, 32RR, and 32FL) so that the disc brake mechanisms 30a-30d (the wheel cylinders 32FR, 32RL, 32RR, and 32FL) are actuated, thereby braking the wheels.

[Electrical Advance Control of Electric Motor 72]

An electrical advance control of the electric motor 72 will now be described.

(Principles)

In the case of using an IPM motor as an actuator for generating a hydraulic pressure, a reluctance torque is optimally controlled together with a magnetic torque, thereby enabling an increase in maximum applied torque. To apply an appropriate reluctance torque, an advance control is employed. The advance control is a mechanical offset in which an attachment position of, for example, a Hall sensor for specifying the position (the rotational angle θ) of the electric motor 72 is mechanically offset. Specifically, the attachment offset (mechanical offset) of the rotational angle sensor 201 is offset by an angle at which the maximum reluctance torque is obtained, thereby enabling generation of a maximum torque of the electric motor 72.

The advance control of the electric motor 72 using a mechanical offset, however, has the following problems.

(1) In an advance control of the electric motor 72, the torque is amplified in one rotational direction, whereas the control becomes a retard control in a reversed rotational direction so that a possible applied torque decreases. In the case of using the electric motor 72 as an actuator of a brake pressure, both a pressure reduction and a pressure increase need to be controlled. Thus, when the offset amount (the advance amount) in attaching the angle sensor is excessively increased in order to amplify a torque in one rotational direction, controllability in the opposite rotational direction is degraded.

(2) In an advance control of the electric motor 72 with a mechanical offset, the offset amount might vary depending on an error in the position at which the rotational angle sensor 201 is attached. A variation of the offset amount reduces the accuracy of the advance control. In particular, in an IPM motor, when the offset amount shifts from an optimum advance amount for characteristics of the motor, the amount of torque that can be applied greatly decreases. Thus, in consideration of occurrence of an error in the offset amount in attaching the sensor (a control range in fabrication), the offset amount in attaching the sensor needs to be set in consideration of the attachment error.

In this embodiment, instead of, or in addition to, an advance control of the motor with a mechanical offset, electrical advance control using the voltage or current of the electric motor 72 is employed. In this embodiment, the motor control section 210 performs electrical advance control. More specifically, the current phase setup section 221b of the current command generator 221 sets a current phase on the basis of a torque command τ* and a current command I* obtained from a rotational speed Nm, and generates a d-axis current command Id* and a q-axis current command Iq* on the basis of the current command I*. As an electrical advance control, the current phase setup section 221b sets a current phase at an advanced side.

To solve problem (1) described above, an advance control in which an electrical advance is provided by controlling the voltage or current of the electric motor 72 and an electrical advance is set at zero upon detection of rotation in a reversed direction, is employed. The electrical advance control can generate an appropriate reluctance torque, thereby increasing the maximum applied torque. In addition, in the reversed rotation of the electric motor 72, a decrease in possible applied torque can be avoided, thereby enhancing controllability.

To solve problem (2) described above, an advance control of the electric motor 72 with a mechanical offset and an electrical advance control are employed. In the case of the electrical advance control and a mechanical offset of offsetting the attachment position of the rotational angle sensor 201, the current phase setup section 221b sets the current phase at an advanced side in consideration of this mechanical offset. Thus, the offset amount (the advance amount) of an optimum mechanical offset can be reduced. Specifically, a decrease in maximum hydraulic pressure due to, for example, an error in a mechanical offset can be reduced, and thus, the accuracy of the advance control can be enhanced. Accordingly, a drop from the maximum torque (the maximum applied pressure) when the mechanical offset deviates from an optimum value can be reduced, thereby reducing a decrease in torque (maximum applied pressure) with respect to an error in attaching the sensor. In addition, the retard amount in reversed rotation is reduced, thereby enhancing controllability in the reversed rotation.

Figure 4:
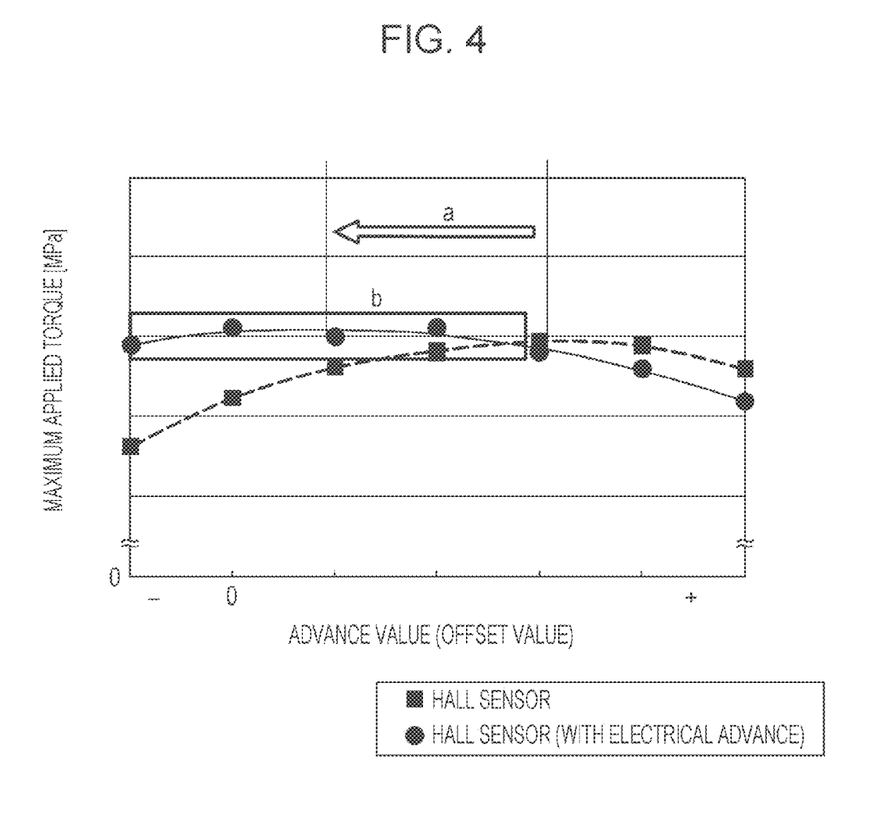
FIG. 4 shows a relationship between a maximum applied pressure of a hydraulic pressure by an electric motor of the electric brake device of the embodiment and an offset amount (an advance amount) of a mechanical offset.

FIG. 4 shows a relationship between the maximum applied pressure [MPa] of a hydraulic pressure by the electric motor 72 (the IPM motor) and an offset amount (an advance amount) [deg] of a mechanical offset. In FIG. 4, the term of an offset value (an advance value) is used in order to express the offset amount (the advance amount) as a degree. The solid circles and squares in FIG. 4 indicate advance by the angular velocity sensor 201 of a Hall sensor specifying a rotor position of the electric motor 72.

The Hall sensor (indicated by solid squares) on the broken line in FIG. 4 represents an offset amount (an advance amount) [deg] in the case of using only a mechanical offset, and the Hall sensor (indicated by solid circles) represents an offset amount (an advance amount) [deg] of a mechanical offset in the case of applying an electrical advance control.

As described above, in an advance control with a mechanical offset, the offset amount (the advance amount) (see solid squares) is set in consideration of generation of an error in the offset amount in attaching the sensor (a control range in fabrication). On the other hand, in this embodiment, the electrical advance control is employed, and thereby, the offset amount (the advance amount) of an optimum mechanical offset itself can be reduced. Specifically, as indicated by arrow a in FIG. 4, the offset amount (the advance amount) [deg] of a mechanical offset in the case of employing an electrical advance control can be advanced by, for example, −10° relative to the offset amount (the advance amount) [deg] in the case of using only a mechanical offset. The decrease in offset amount (advance amount) of the mechanical offset reduces the retard amount in reversed rotation, thereby enhancing controllability in the reversed rotation.

As indicated by frame b in FIG. 4, when the offset amount (the advance amount) [deg] deviates from an optimum value, application of an electrical advance control can reduce a drop from a maximum torque (a maximum applied pressure). Consequently, a decrease in torque (maximum applied pressure) relative to an error in attaching the sensor can be reduced.

Figure 5:
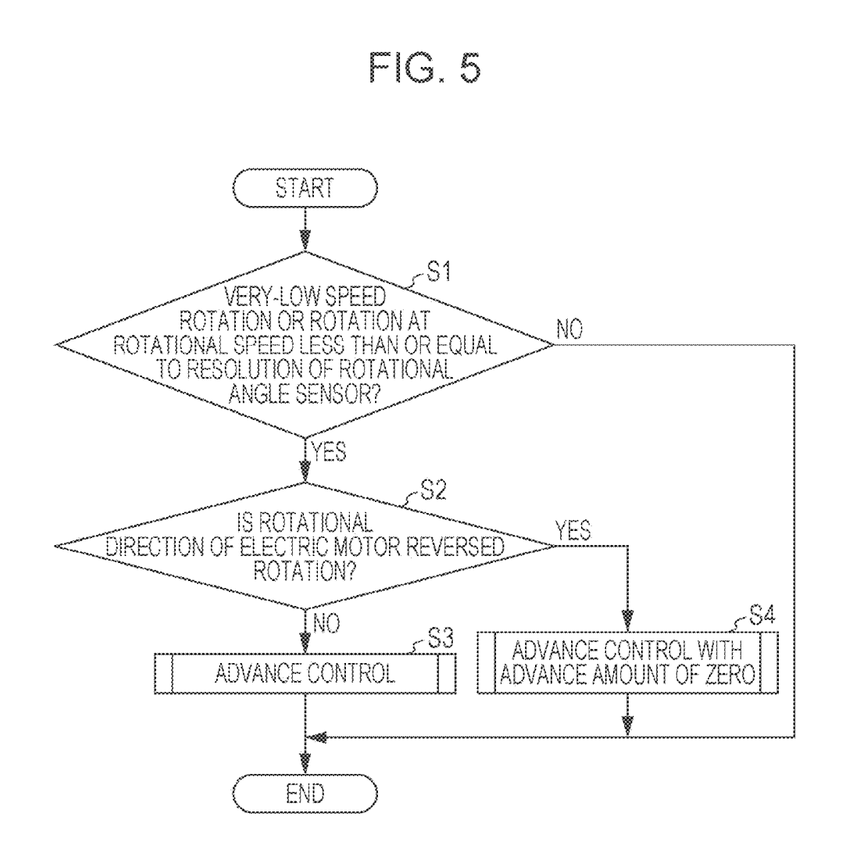
FIG. 5 is a flowchart showing an electrical advance control by the motor control section of the electric brake device of the embodiment.

FIG. 5 is a flowchart showing an electrical advance control of the motor control section 210. In FIG. 5, S denotes steps of the flow. The flow is repeatedly performed at each predetermined timing by an ECU constituting the controller 200.

First, at step S1, the motor control section 210 (see FIG. 3) determines whether the electric motor 72 is stopped or rotates at very low speed in a rotational direction (at a normally boosting side) or rotates at a speed less than or equal to the resolution of the rotational angle sensor 201 (see FIG. 3). The electric motor 72 is a motor that relatively needs a torque. A rotational speed Nm of the electric motor 72 is calculated by the rotational speed calculator 226 based on a rotor rotational angle θ detected by the rotational angle sensor 201. The motor control section 210 increases a torque in a state in which the electric motor 72 is stopped or rotates at a rotational speed less than or equal to the resolution of the rotational angle sensor 201 or at very low speed. Thus, by increasing a maximum applied hydraulic pressure with an electrical advance, an appropriate advance can be given to the advance control in low-speed rotation, in addition to an advance (e.g., a field weakening control) in a normal rotation state of the motor.

If it is determined that the electric motor 72 neither is stopped nor rotates at very low speed or a rotational speed less than or equal to the resolution of the rotational angle sensor 201 in the rotational direction (i.e., No in S1), this flow ends.

If it is determined that the electric motor 72 is stopped or rotates at very low speed or a rotational speed less than or equal to the resolution of the rotational angle sensor 201 in the rotational direction (i.e., Yes in S1), the motor control section 210 determines whether rotational direction of the electric motor 72 is a reversed rotational direction (i.e., at a pressure-reducing side) or not at step S2. The rotational direction of the electric motor 72 is detected by the rotational direction detector 221a based on a rotor rotational angle θ detected by the rotational angle sensor 201 and a rotational speed Nm calculated by the rotational speed calculator 226.

If the rotational direction of the electric motor 72 is not a reversed rotational direction (i.e., No in S2), an electrical advance control is performed at step S3, and the flow ends. On the other hand, if the rotational direction of the electric motor 72 is a reversed rotational direction (Yes in S2), an advance control in which an electrical advance is zero is performed at step S4, and the flow ends.

Figure 6:
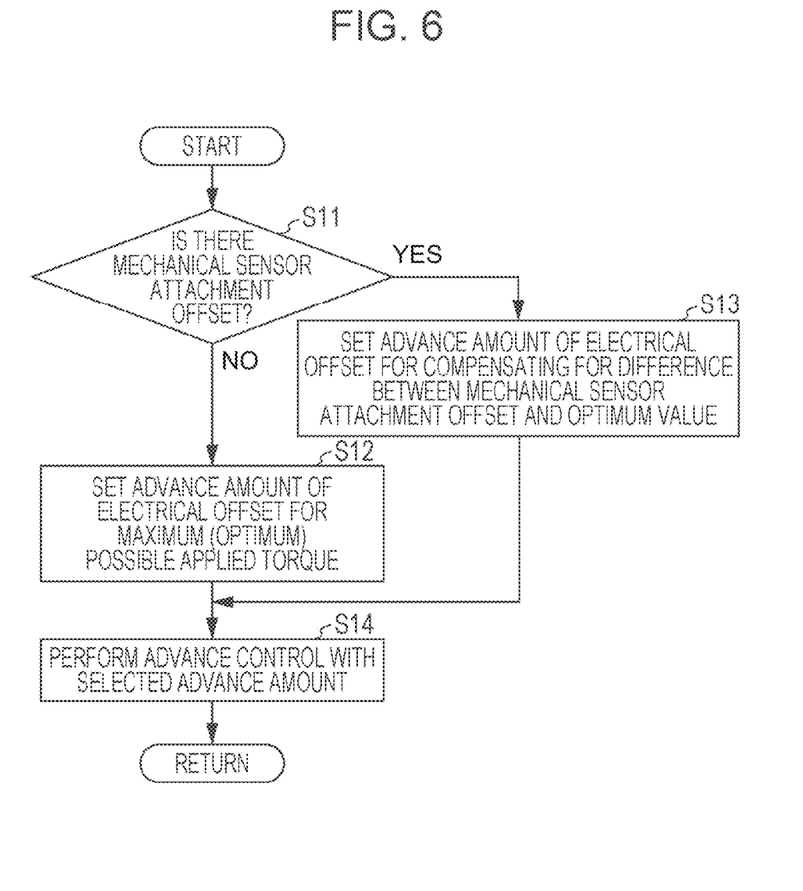
FIG. 6 shows a subroutine of the advance control by the electric brake device of the embodiment.

FIG. 6 is a flowchart showing an electrical advance control of the motor control section 210. This flow is a subroutine of the advance control performed at steps S3 and S4 in FIG. 5.

First, at step S11, the motor control section 210 (see FIG. 3) determines whether there is a mechanical sensor attachment offset or not. If there is no mechanical sensor attachment offset, i.e., there is only an electrical advance control (i.e., No in S11), the current command generator 221 (see FIG. 3) sets an advance amount of an electrical offset with which a possible applied torque is at maximum (i.e., an optimum value) at step S12. Specifically, the current phase setup section 221b (see FIG. 3) of the motor control section 210 sets a current phase based on a torque command τ* and a current command I* obtained from a rotational speed Nm. In this case, the current phase setup section 221b sets a current phase at an advanced side as an electrical advance control. In setting the current phase at zero degree, the current phase setup section 221b generates a q-axis current command Iq* equal to a current command I* using the q-axis current command Iq* as zero.

On the other hand, if there is a mechanical sensor attachment offset, i.e., an electrical advance control is additionally used at step S11 (i.e., Yes at S11), the current command generator 221 sets an advance amount of an electrical offset that compensates the difference between the mechanical sensor attachment offset and optimum advance which enables the maximum possible applied torque (the optimum value) at step S13. Specifically, the current phase setup section 221b of the motor control section 210 sets the current phase at an advanced side such that the difference between the mechanical sensor attachment offset and the optimum advance with the maximum possible applied torque (the optimum value) are compensated for by an electrical advance control. Since the electrical advance control is used for the advance control of the motor with a mechanical offset, an allowance for a sensor attachment error with a mechanical offset can be enhanced as compared to the case of using only a mechanical offset for an advance control. In addition, since a required sensor attachment offset is reduced, the retard amount in reversed rotation decreases, thereby enhancing controllability in the reversed rotation.

At step S14, the motor control section 210 performs an electrical advance with the set advance amount, and the flow returns to steps S3 and S4 in FIG. 5. Specifically, in the electrical advance, the PI calculator 222 to the PWM signal generator 224 (see FIG. 3) at subsequent stages generate switching control signals S1-S6 in accordance with advance setting of the current phase by the current command generator 221. For example, if the advance of an electrical advance control (an advanced phase) relative to a rotor rotational angle θ (an output signal phase) of the rotational angle sensor 201 is larger than (advanced relative to) a predetermined range, a PWM duty is increased. On the other hand, if the advanced phase is smaller than the predetermined range, the PWM duty is reduced.

As described above, in this embodiment, the electric brake device 10 includes the motor cylinder device 16 that generates a hydraulic pressure in accordance with brake operation of the driver by using the electric motor 72, the rotational angle sensor 201 that detects a rotor rotational angle θ of the electric motor 72, and the motor control section 210 that controls an output torque of the electric motor 72 corresponding to the rotor rotational angle θ and also controls the electric motor 72 by advancing the detection value of the rotational angle sensor 201. In this embodiment, the motor control section 210 includes the current command generator 221 including the rotational direction detector 221a that detects stop or a rotational direction of the electric motor 72 and the current phase setup section 221b that sets a current phase such that a combined torque which is a combination of a magnetic torque and a reluctance torque is at maximum. The current phase setup section 221b sets a current phase at an advanced side as an electrical advance control. In reversed rotation of the electric motor 72, the current phase setup section 221b inhibits an advance or sets the current phase at a retarded side. In the case of using an electrical advance control and a mechanical offset for offsetting the attachment position of the rotational angle sensor 201, the current phase setup section 221b sets the current phase at an advanced side in consideration of the mechanical offset.

A field weakening control for increasing the number of revolutions may be continued in a case where an advance control is inhibited in reversed rotation of the electric motor 72. That is, an advance control or a field weakening control itself in normal operation may not be inhibited in reversed rotation of the electric motor 72, and an advance control disclosed herein may be inhibited.

In this embodiment, the motor control section 210 inhibits an advance control in reversed rotation of the electric motor 72 such that a retard control is performed in the reversed rotation, and thereby, controllability of the reversed rotation is enhanced.

In addition, in this embodiment, in the case of mechanically offsetting the attachment position of the rotational angle sensor 201, the motor control section 210 performs an electrical advance based on an error in this mechanical offset so that the mechanical offset is taken into consideration. Thus, accuracy of the advance control can be enhanced.

In the foregoing embodiment, the motor cylinder device 16 is used as an external pressure source, for example. Alternatively, the external pressure source may be constituted by, for example, a pump that draws brake fluid from a reservoir, an electric motor serving as a drive source for the pump, and an accumulator 124 in which brake fluid from the pump is accumulated under pressure.

In this brake method (the brake system), a configuration in which a braking force is applied based only on power of the electric motor 72, as an example. Alternatively, a regenerative braking force may be taken into consideration in the above-described braking force (a hydraulic pressure braking force) generated by a hydraulic pressure. The controller 200 calculates a regenerative braking force (a regenerative braking force) based on the amount of brake operation, the amount of electricity (charge or electric power) stored in a high-pressure battery (not shown), and a maximum value of a current charge current, for example. In addition, the controller 200 subtracts the calculated regenerative braking force from the total braking force to calculate a hydraulic pressure braking force. In this manner, a hydraulic pressure braking force is set (distributed) in consideration of the regenerative braking force, thereby reducing the hydraulic pressure braking force and reducing power consumption of the electric motor 72. This distribution method is merely an example, and various distribution methods may be employed.

Disclosed herein is a type of a brake device using a motor (a drive motor) as a power generator and generating a braking force by collecting kinetic energy during running as electric energy.

The foregoing embodiment has been described in detail for understanding of the present disclosure, and does not need to include all the components disclosed herein. Some of the components of one embodiment may be replaced with those of another embodiment, and the configuration of one embodiment may be added to the configuration of another embodiment. Addition, deletion, and/or replacement of the configuration of one embodiment may be performed on part of the configuration of another embodiment.

We claim:

1. An electric brake device comprising:
   an electric hydraulic pressure generator configured to generate a hydraulic pressure in accordance with a brake operation of a driver with an electric motor;
   a rotational angle sensor configured to detect a rotational angle of the electric motor; and
   an electric motor controller configured to control an output torque of the electric motor corresponding to the rotational angle, wherein
   the electric motor controller controls the output torque of the electric motor by advancing a detection value of the rotational angle sensor,
   wherein the rotational angle sensor is attached to the electric motor with a first advance amount angle of a mechanical offset of an attachment position, and wherein the electric motor controller electrically advances the detection value of the rotational angle sensor with an additional second advance amount angle such that an optimum advance amount angle is obtained by summation of the first advance amount angle and the additional second advance amount angle, the optimum advance amount angle corresponding to maximum torque generated by the electric motor.

2. The electric brake device of claim 1, wherein the electric motor controller inhibits the advancing the detection value when the electric motor performs reversed rotation.

3. The electric brake device of claim 1, wherein the electric motor controller adds the additional second advance amount angle by advancing a current phase of an inverter that drives the electric motor.

4. The electric brake device of claim 1, wherein the electric motor controller sets the additional second advance amount angle such that the output torque becomes maximum.

5. The electric brake device of claim 2, further comprising a rotational direction detector configured to detect rotational direction of the electric motor.

6. A control method of an electric brake device comprising an electric hydraulic pressure generator configured to generate a hydraulic pressure in accordance with a brake operation of a driver with an electric motor, the method comprising:
  (i) detecting a rotational angle of the electric motor by a rotational angle sensor; and
  (ii) controlling, by a computer, an output torque of the electric motor corresponding to the rotational angle, wherein
  the step (ii) controls the output torque of the electric motor by advancing a detection value of the rotational angle sensor,
  wherein the rotational angle sensor is attached to the electric motor with a first advance amount angle of a mechanical offset of an attachment position of the rotational angle sensor, and
  the step (ii) electrically advances the detection value of the rotational angle sensor with an additional second advance amount angle such that an optimum advance amount angle is obtained by summation of the first advance amount angle and the additional second advance amount angle, the optimum advance amount angle corresponding to maximum torque generated by the electric motor.

7. The electric brake device of claim 1, wherein the electric motor is an Interior Permanent Magnet (IPM) motor.

8. The control method of claim 6, wherein the electric motor is an Interior Permanent Magnet (IPM) motor.

9. The electric brake device of claim 1, wherein the electric motor controller determines whether the electric motor is stopped or rotates at a speed less than or equal to a resolution of the rotational angle sensor, and if so, the electric motor controller electrically advances the detection value of the rotational angle sensor by using an error in the first advance amount angle of the mechanical offset so as to compensate the error.

10. The control method of claim 6, wherein the step (ii) includes determining whether the electric motor is stopped or rotates at a speed less than or equal to a resolution of the rotational angle sensor, and if so, the step (ii) electrically advances the detection value of the rotational angle sensor by using an error in the first advance amount angle of the mechanical offset so as to compensate the error.

11. The electric brake device of claim 1, wherein the optimum advance amount angle is not zero.

12. The control method of claim 6, wherein the optimum advance amount angle is not zero.

13. The electric brake device of claim 11, wherein the first advance amount angle is not zero.

14. The control method of claim 12, wherein the first advance amount angle is not zero.

15. The control method of claim 1, wherein the electric motor controller compensates an error in the attachment position of the rotational angle sensor.

16. The control method of claim 6, wherein the step (ii) compensates an error in the attachment position of the rotational angle sensor.

* * * * *